K. TAMARU & M. SUGAWARA
INVENTORS
BY Stephen H. Frishauf
Atty

K. TAMARU & M. SUGAWARA
INVENTORS
BY [signature]
Atty

K. TAMARU & M. SUGAWARA
INVENTORS
BY Stephen H. Frishauf
Atty

United States Patent Office 3,452,186

Patented June 24, 1969

3,452,186

HIGH SPEED COUNTER DEVICE

Keikichi Tamaru and Mutuo Sugawara, Yokohama-shi, Japan, assignors to Tokyo Shibaura Electric Co., Ltd., Kawasaki-shi, Japan, a corporation of Japan

Filed Dec. 10, 1965, Ser. No. 513,132

Claims priority, application Japan, Feb. 24, 1965, 40/10,224

Int. Cl. G06f *7/38*

U.S. Cl. 235—92 3 Claims

ABSTRACT OF THE DISCLOSURE

A high speed counter device in which an input signal is applied to both a delay circuit and to an AND-circuit, a bistable circuit being coupled to the output of the delay circuit. The output of the delay circuit sets the bistable circuit which in turn enables the AND-circuit. The output of the AND-circuit then causes the bistable circuit to be re-set and to thereby disable the AND-circuit, a narrow output pulse being generated at the output of the AND-circuit.

This invention relates to a high speed counter device which is capable of high speed operation at frequencies ranging from 180 mHz. to 300 mHz., and which makes possible the counting of an arbitrary repetition rate pulse signal.

A conventional counter device has been composed in the past as illustrated in FIG. 1. An input terminal 1 is connected through resistance 2 to the first terminal of tunnel diode 3 of which the second terminal is grounded. The first terminal of the said diode 3 is also connected through a series circuit of an inductance element 4 and resistance 5 to a positive direct voltage source +V. The first terminal is further coupled to the output terminal 6.

This known counter device operates such that, when an input pulse signal is applied to the input terminal 1, an output pulse signal may be generated at the output terminal 6 by utilizing an overshoot effect caused by the oscillating current flowing into the tunnel diode 3.

The inductance element 4 is connected in series with the tunnel diode 3, and consequently, the time constant of the output pulse is increased to a large value. Therefore this known circuit has the disadvantage in that high speed operation cannot be realized.

Hence, the principal object of this invention is to provide a high speed counter device capable of operation at frequencies ranging from 180 mHz. to 300 mHz.

Another object of this invention is to provide an improved high speed counter device capable of operation with an arbitrary repetition rate pulse signal.

Other objects and advantages of this invention will be apparent from the following description taken in connection with the accompanying drawings in which:

FIG. 3(*b*) shows an actual circuit configuration of one embodiment of the polarity inversion circuit used in the device of the present invention;

FIG. 3(*c*) shows a circuit configuration of an AND circuit;

Figure 1:
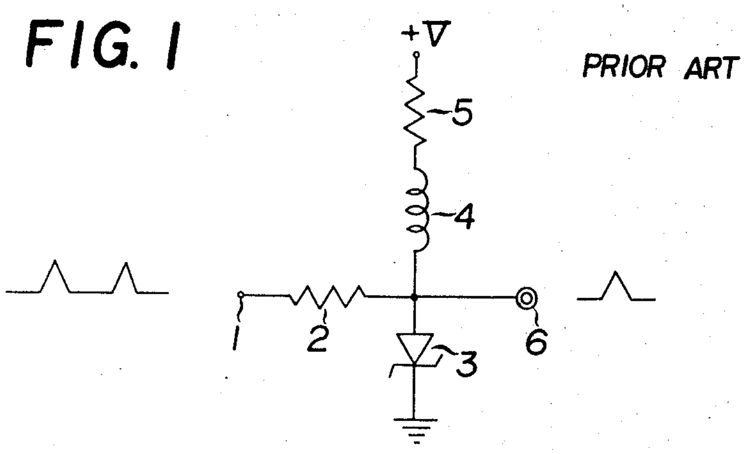
FIG. 1 shows the circuit of a conventional binary counter device of the prior art.
Figure 2:
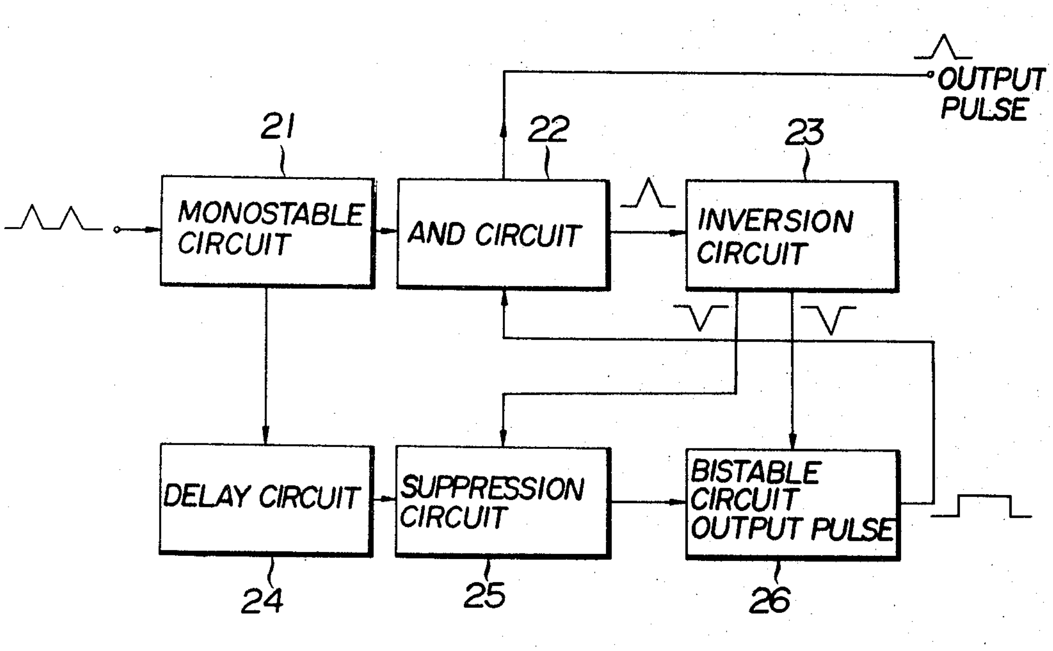
PRIOR ART FIG. 2
FIG. 2 shows the block diagram illustrating a high speed counter device for use in carrying out the present invention.

Referring first to FIG. 2, an input pulse signal to be counted is applied to monostable circuit 21. The reshaped pulse signal which has been reshaped by the said monostable circuit 21 is applied to AND circuit 22, which is in its blocked state. An output of AND circuit 22 is coupled to polarity inversion circuit 23, an output of which is coupled to bistable circuit 26. The output of bistable 26 is connected to an input of AND circuit 22. Since the AND circuit 22 is not activated the bistable circuit 26 is in a low voltage state, and the AND circuit 22 remains unactivated. As a result, the inverted output of the inversion circuit 23 is not generated. The reshaped pulse signal which has been reshaped by the said monostable circuit 21, in transmitted to delay circuit 24, is then sent through suppression circuit (NOT gate and circuit) 25 to an input of said bistable circuit 26. The output of suppression circuit 25 sets the bistable circuit 26 in a high voltage state. Then, the following input pulse signal is applied to the said monostable circuit 21. Since the bistable circuit 26 is now in the high voltage state, AND circuit 22 is activated (by the output of bistable 26 and said following pulse signal) and the reshaped pulse signal, which has been reshaped by the monostable circuit 21, is transmitted through to the polarity inversion circuit 23. The inverted output pulse signal of the said inversion circuit 23 is applied to both the suppression circuit 25 and the bistable circuit 26, and prevents the delayed output pulse signal retarded by the delay circuit 24 from reaching the bistable circuit, and again sets the bistable circuit 26 in the low voltage state. The output pulse of the counter device is taken from, for example, the output of AND circuit 22.

Figure 3A:
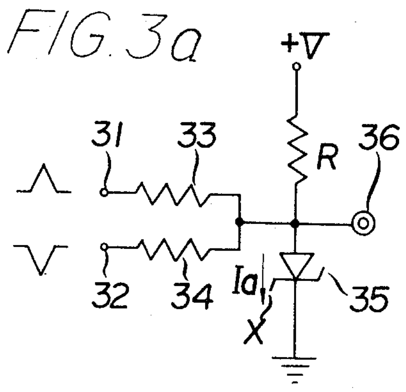
FIG. 3(*a*) shows an actual circuit configuration of one embodiment of the bistable circuit in the device illustrated in FIG. 2.
Figure 3B:
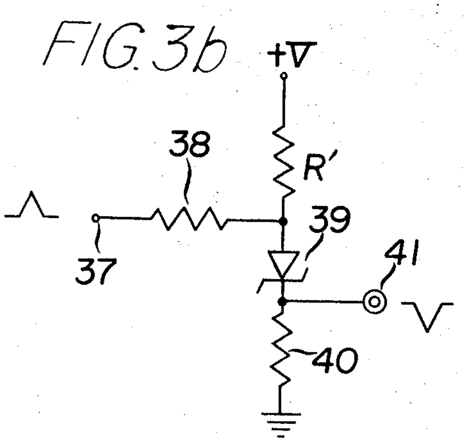
Figure 3C:
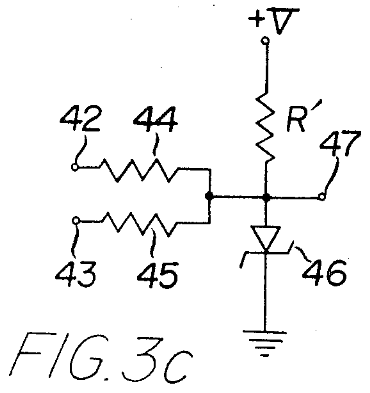

FIG. 3 shows the various circuits used in the high speed counter device embodying the present invention. FIGS. 3(*a*), (*b*) and (*c*) show respectively the bistable circuit 26, the polarity inversion circuit 23, and the AND circuit 22. In FIG. 3(*a*), the input terminals 31 and 32 are connected through resistances 33 and 34 respectively to the first terminal of tunnel diode 35. The second terminal of diode 35 is grounded. The first terminal of the said diode 35 is connected through load resistance R to a positive direct voltage source +V, and to an output terminal 36. When no input pulse signal is applied to the input terminal 31, current I*a* flows into the tunnel diode 35 in the direction shown by the arrow X.

Figure 4:
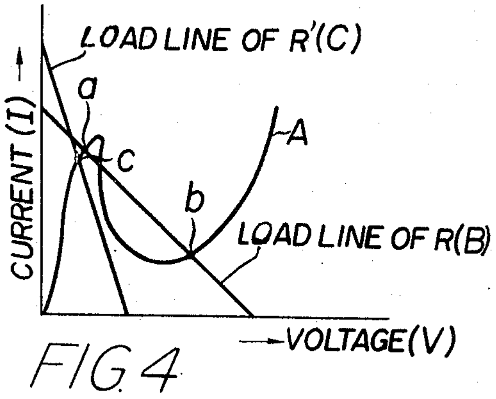
FIG. 4 shows the load line diagram of a tunnel diode.

The characteristic curve A of current I vs. voltage V for the tunnel diode 35 is illustrated in FIG. 4, which also illustrates load lines B and C. Hence, when no input pulse signal is applied to the input terminal 31, tunnel diode 35 will be in the low voltage state *a*. Next, if the first input pulse signal is applied to the input terminal 31, the state of the tunnel diode 35 will change to the high voltage state *b*. Next, if another input pulse signal which is more retarded in time than the first input pulse signal and has an inverted polarity, is applied to the input terminal 32, the said tunnel diode 35 will change again to the low voltage state *a* and a positive output pulse signal will be obtained at the output terminal 36. Referring to FIG. 3(*b*), the polarity inverter circuit 23 is constructed so that the input terminal 37 is connected through resistance 38 to the first terminal of tunnel diode 39, the first terminal of the said diode 39 is connected through the resistance R′ to the positive direct voltage source +V, the second terminal of the said diode 39 is grounded through resistance 40, and an output terminal 41 is coupled to the second terminal of the said diode 39. When no positive input pulse signal is applied to the input terminal 37, the tunnel diode 39 is in the low voltage state *c*. However, when a positive input pulse signal is applied current flowing into the said diode 39 will decrease, and if the positive input pulse signal disappears, the tunnel diode 39 will recover to the original low voltage state *c*. Thus, a negative output signal is obtained at the output terminal 41.

The AND circuit 22 is constructed as illustrated in FIG. 3(*c*). Input terminals 42 and 43 are connected through resistances 44 and 45, respectively, to the first terminal of tunnel diode 46, the second terminal of which is grounded. The first terminal of diode 46 is connected through resistance R′ to positive direct voltage source +V, and an output terminal 47 is coupled to the first terminal of diode 46. When no input pulse signal is applied to the input terminals 42 and 43, the tunnel diode 46 is in the low voltage state *c* shown in FIG. 4. However, when an input pulse is applied to terminals 42 and 43, the tunnel diode 46 is transferred to the high voltage state *b*. If the input pulse signal disappears, the tunnel diode 46 will again recover to the low voltage state *c*, an output pulse signal being obtained at the output terminal 47.

Figure 5:
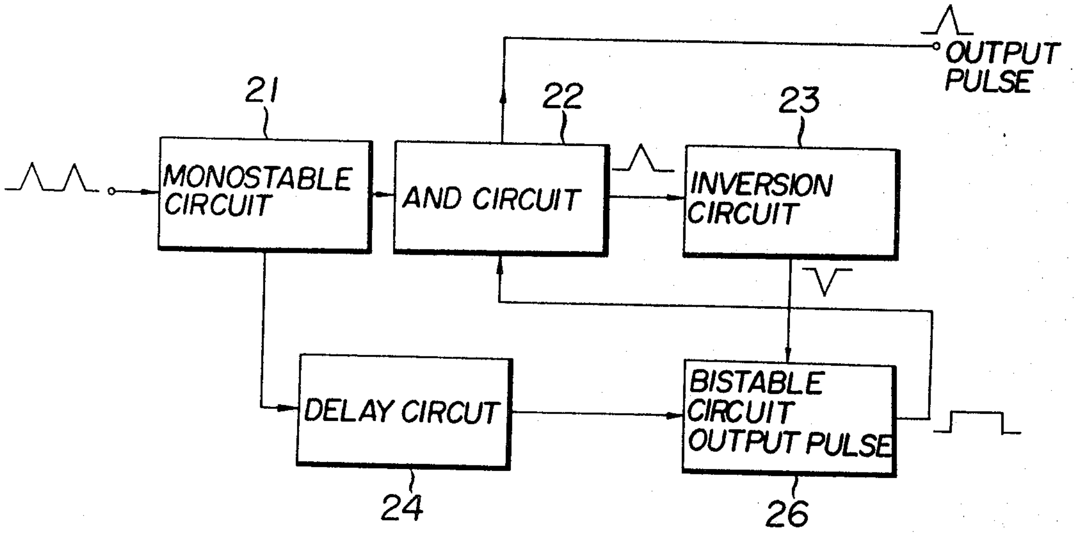
FIG. 5 shows an alternative block diagram of a high speed counter device embodying the present invention.

FIG. 5 shows an alternative block diagram of the high speed counter device embodying the present invention, in which the suppression circuit of FIG. 2 is omitted. The same reference designations are used in FIGS. 2 and 5 for identical elements. Input pulse signals to be counted are applied to the monostable circuit 21, and reshaped. Now, when the bistable circuit 26 is in the foregoing low voltage state *a* (see FIG. 4) the reshaped pulse signal which is reshaped by monostable circuit 21 is blocked by the AND circuit 22, since both inputs to the AND circuit 22 are not in their high voltage state. After the reshaped pulse signal is retarded by the delay circuit 24, it is transmitted to the bistable circuit 26 to set the bistable circuit 26 in the high voltage state *b*. When the following input pulse signal is applied to the monostable circuit 21, the reshaped pulse which is reshaped by the monostable circuit 21 is transmitted through the AND circuit 22 to the polarity inversion circuit 23, resulting in the generation of an inverted output pulse signal. The inverted output pulse signal is applied to the bistable circuit 26, and resets said circuit 26 in the low voltage state *a* (see FIG. 4). The output pulse signal can be taken from, for example, the output of AND circuit 22. Moreover, when the bistable circuit 26 is set in the high voltage state *b*, even if a retarded output pulse signal which is delayed by the delay circuit 24 is applied thereto the bistable circuit 26 will not be further switched out of its high voltage state *b*.

In the embodiment of FIG. 5, high speed performance is obtained since tunnel diodes are used for the bistable circuit 26, the AND circuit 22, the monostable circuit 21, and the polarity inversion circuit 28, respectively, in addition to pure resistances R without any inductances being present in the bistable circuit 26. Of course, instead of tunnel diodes, transistors can be used in bistable circuit 26. The AND circuit 22, the monostable circuit 21, and the polarity inversion circuit 23 are also capable of high speed operation. It has been verified by inventors that very reliable high speed operation can be achieved under the frequency of 300 mHz.

As above stated, input pulse signals having a maximum repetition rate of approximately 300 mHz. can be counted by using the high speed counter device of the present invention. Moreover, it is possible to realize a counter device in an *n*-figure system which is constructed by combining a plurality of the devices of this invention.

It will be understood that the devices described herein are intended only as illustrative examples of the invention and that the invention is not limited to those embodiments specifically described herein.

Further, it will be apparent that many other modifications may be made to the particular embodiments of the invention described herein. It is to be understood that the applicants intend to cover all such modifications that fall within the true spirit and scope of the invention.

What is claimed is:

1. A high speed counter device comprising:
a delay circuit;
an AND circuit;
means for substantially simultaneously and directly applying the same input signal to be counted to both said delay and AND circuits;
a polarity inversion circuit coupled to the output of said AND circuit;
a bistable circuit, the output of which is set by a delayed signal from the output of delay circuit and reset by an inverted signal from the output of said polarity inversion circuit; and
means coupling the output of said bistable circuit to said AND circuit such that said input signal is passed through said AND circuit only when the output of said bistable circuit is set.

2. A high speed counter device according to claim 1 wherein said counter device further comprises a monostable circuit coupling said input signal to be counted to said AND and delay circuits.

3. A high speed counter device according to claim 1 wherein said counter device further comprises a suppression circuit coupled between said delay circuit and said bistable circuit; and
means coupling the inverted signal from said polarity inversion circuit to said suppression circuit for preventing the delayed signal output from said delay circuit from passing therethrough only when the inverted signal is applied to the suppression circuit.

References Cited

UNITED STATES PATENTS

| | | | |
|---|---|---|---|
| 2,962,212 | 11/1960 | Schneider | 235—92 |
| 3,145,342 | 8/1964 | Hill | 328—92 |
| 3,192,478 | 6/1965 | Metz | 235—92 |

MAYNARD R. WILBUR, *Primary Examiner.*

J. M. THESZ, *Assistant Examiner.*

U.S. Cl. X.R.

307—224, 271; 328—55